C. E. TWAMLEY.

SEED CORN TESTER.

APPLICATION FILED AUG. 4, 1909.

Reissued Oct. 26, 1909.

13,031.

2 SHEETS—SHEET 1.

Witnesses.
W. A. Loftus.
A. S. Hague.

Inventor.
C. E. Twamly.
by Orwig & Lane Atty's.

ANDREW B. GRAHAM CO., PHOTO-LITHOGRAPHERS, WASHINGTON, D. C.

C. E. TWAMLEY.

SEED CORN TESTER.

APPLICATION FILED AUG. 4, 1909.

Reissued Oct. 26, 1909.

13,031.

2 SHEETS—SHEET 2.

Witnesses
W. A. Loftus.
A. G. Hague

Inventor.
C. E. Twamly.
by Orwig & Lane, Attys.

UNITED STATES PATENT OFFICE.

CLARK E. TWAMLEY, OF ALEXANDRIA, SOUTH DAKOTA.

SEED-CORN TESTER.

13,031. Specification of Reissued Letters Patent. Reissued Oct. 26, 1909.

Original No. 866,989, dated September 24, 1907, Serial No. 367,250. Application for reissue filed August 4, 1909. Serial No. 511,261.

*To all whom it may concern:*

Be it known that I, CLARK E. TWAMLEY, a citizen of the United States, residing in Alexandria, in the county of Hanson and State of South Dakota, have invented certain new and useful Improvements in Seed-Corn Testers, of which the following is a specification.

Heretofore it has been customary to provide seed testers with means whereby the seeds may be placed either in moist earth or in contact with a moist material in such a manner that a sufficient amount of air can reach the seeds so that they will germinate while remaining in contact with the moist material.

My object is to provide a seed tester in which all of the seeds to be tested are placed in proper position in the tester, and then all are completely covered with water so that all of them may be thoroughly soaked before any of them are permitted to germinate or sprout. Then after the seeds are thoroughly soaked, the water is drawn off and the seeds are then subjected to warm moist air so that the fertile seeds may sprout and the entire root system of each seed as well as the sprout may be readily and quickly examined so that the hard and flinty seeds which are usually the most desirable for planting will be soaked just as thoroughly as the soft and porous seeds before any opportunity is given to any of the seeds to germinate or sprout, and so that the roots of the germinated seeds may be observed just as readily and easily as the sprout.

A further object is to provide simple and inexpensive casing, trays, and seed cups.

A further object is to provide an improved crib of simple and inexpensive construction for holding ears of corn in such a manner that they may be kept well ventilated and dry, and properly marked for identification with the seeds taken from them for use in the tester.

My invention consists in the construction, arrangement, and combination of the various parts of the device, whereby the objects contemplated are attained, as hereinafter more fully set forth, pointed out in my claims, and illustrated in the accompanying drawings, in which—

Figure 1:
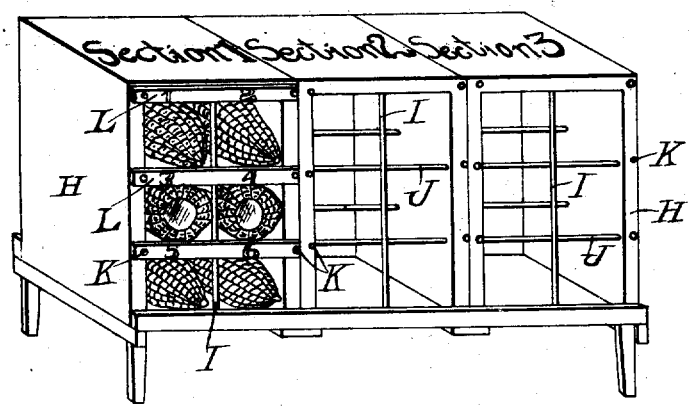
Figure 2:
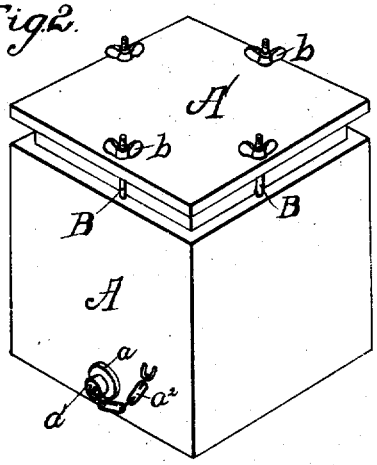
Figure 3:
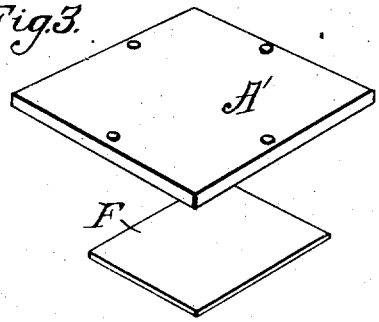
Figure 3:
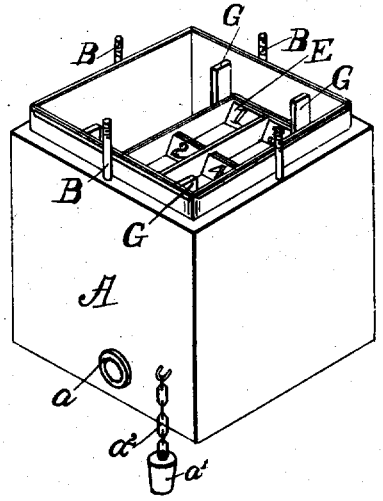
Figure 4:
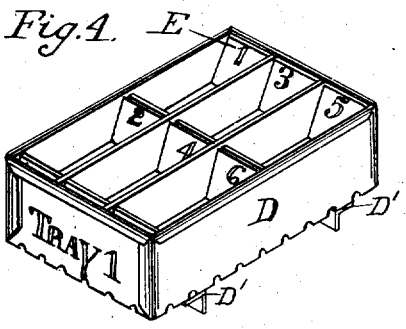
Figure 5:
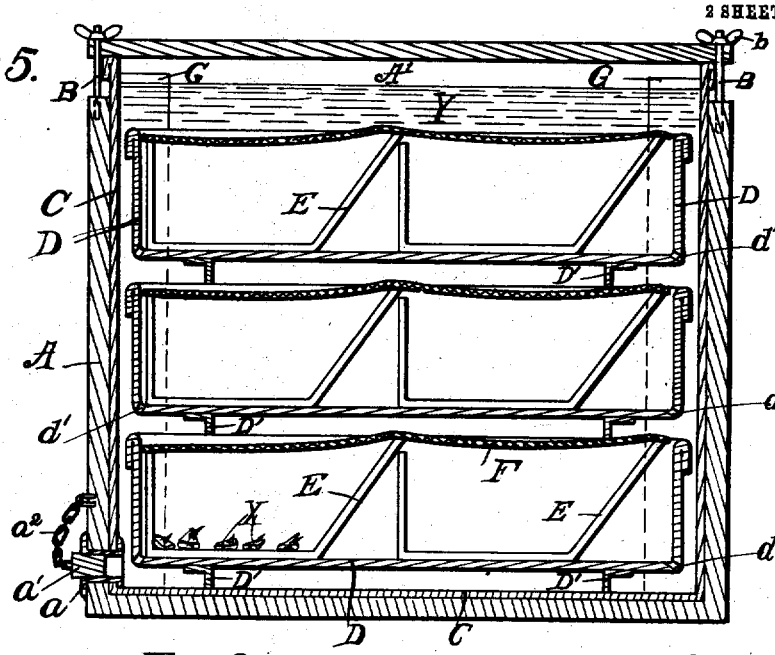
Figure 6:
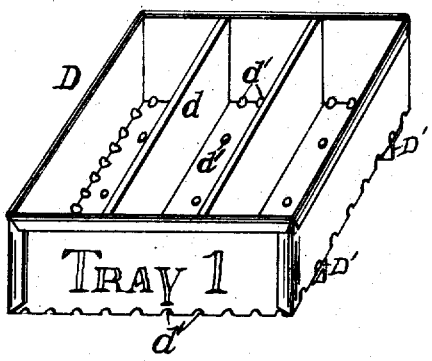
Figure 7:
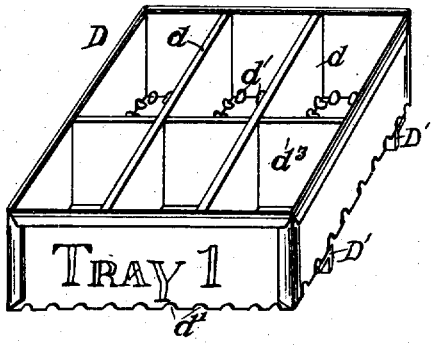
Figure 8:
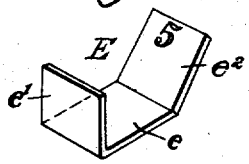
Figure 9:
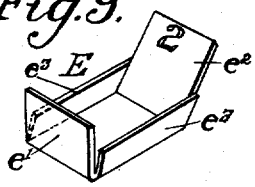

Figure 1 is a perspective view of a crib made up of three sections. Fig. 2 is a perspective view of the germinating box with the top or cover secured in place and the discharge opening at the bottom of the box closed. Fig. 3 is a perspective view with the cover removed and with the water discharge opening open. Fig. 4 is a perspective view of one of the trays containing seed cups. Fig. 5 shows a vertical central section through the germinator. Fig. 6 is a perspective view of one of the trays. Fig. 7 is a perspective view of a modified form of tray. Fig. 8 is a perspective view of one form of cup or seed receptacle which may be employed, and—Fig. 9 is a perspective view of the modified form of seed cup.

The germinating box, A, may be constructed of wood lined with metal, C, and is closed at the bottom and at the sides but has a discharge opening, $a$, which may be closed by a plug or stopper, $a'$, attached to a chain, $a^2$. Preferably the lining, C, extends above the top of the box, but this is not essential. The cover, A′, is attached to the box by means of vertical rods, B, extending through holes in the cover and threaded to engage nuts, $b$, by means of which the cover may be screwed down tightly upon its seat.

As shown in Fig. 3, vertically arranged strips, G, are employed to hold the trays away from the opposite sides of the box. The tray, D, shown in Fig. 6 has a bottom which is perforated at $d'$ and it is divided into compartments by vertical partitions, $d$. As illustrated, the tray is divided into three compartments and each tray is provided with cross pieces, D′, on the bottom for the purpose of holding the bottom tray elevated above the bottom of the box and for holding the bottoms of the other trays above the tops of the trays immediately below them. In Fig. 7 the three compartments of the tray are shown as further divided by a partition $d^3$ so as to provide six compartments.

I preferably employ a seed cup or receptacle, E, of the kind shown in Fig. 8, as this can be made very cheaply. As shown, it is made of a piece of sheet metal the bottom, $e$, of which joins a vertical end piece, $e'$, and an upwardly inclined end piece, $e^2$, which bears a number as indicated.

In Fig. 9, vertical side pieces, $e^3$, are added in order to prevent the seed from spilling out at the side, although this is not considered essential.

The seed cups or receptacles are arranged in the trays in the manner shown in Fig. 4 where it will be observed that the numbers are systematically arranged for purposes of identification, as will be hereinafter explained. In practical operation with this part of the device, I first place the seeds to be tested in the various seed cups without the use of earth or other moist material in contact with the sides. I then insert the plug *a'*, and then fill the casing with water so that all of the seed cups are filled and all of the seeds are submerged. The cover may then be applied if desired although this is not necessary. In Figs. 5, Y, indicates water. The seeds are allowed to remain submerged in water for a period of from one to two days, depending on the temperature of the water. If the water is comparatively warm, one day will suffice. No harmful results are attained if the seeds are kept submerged for an indefinite period as the process of germination cannot take place so long as the seeds are wholly submerged. The seeds that are hard and flinty will not take up water and become thoroughly soaked as rapidly as the seeds that are soft and porous, and yet it is well known that the former type of seeds are best for planting purposes. After the seeds have become thoroughly soaked, then the plug is removed and all of the water drawn out of the casing. It is then essential that the plug be replaced and that the cover be tightly fitted to the casing to thereby retain moisture. When this has been done, the casing is permitted to stand for a period of approximately two days, and when opened the good seeds will have sprouted and the root systems thereof will also have been developed. Then the operator may examine the sprouted seeds and keep a proper record of them for comparison with the ears of corn from which the seeds were taken. He may also examine the roots of the various seeds. The numbering of the seed receptacles and the trays enables the operator to keep a proper record.

In connection with the germinator, I employ a crib of the kind illustrated in Fig. 1. This crib is made in sections corresponding with the number of trays employed. Section No. 1 of the crib corresponds with tray No. 1 of the germinator; section No. 2 of the crib, with tray No. 2; and section No. 3 of the crib, with tray No. 3. Each crib section has the same number of compartments as its corresponding tray. As illustrated, each crib section consists of a casing H, open at opposite ends and divided into compartments by wires, I, J, arranged at right angles to each other and on which the ears of corn may be supported. This construction affords perfect ventilation and easy manipulation.

In Fig. 1, each section is shown as containing six compartments corresponding with the six compartments of the trays. Instead of numbering each compartment, I provide detachable strips, L, carrying numbers and which may be detachably connected with the front ends of the cribs by means of pins, K. It is only necessary to provide numbered strips for one section as the same strips may be detached from one section and applied to the next. In this way a single set of strips may be used for three, a dozen, or even a hundred crib sections, and there will be no confusion inasmuch as each tray of the germinator is examined in connection with a single section of the crib.

It is obvious that my improvements may be employed for testing not only seed corn, but also other kinds of seed.

I claim as my invention:

1. A seed germinator comprising a box having a detachable cover and provided with a water discharge opening at the bottom, a series of trays in the box, and a series of detachable numbered seed cups arranged in the trays.

2. A seed germinator comprising a water-tight box having a water discharge opening at the bottom, a detachable cover, a series of numbered perforated trays arranged in the box, and a series of numbered detachable seed cups or receptacles contained in the trays.

3. A seed germinator comprising a water-tight box having a detachable cover and provided with a water discharge opening at the bottom, a series of perforated numbered trays arranged one above the other in the box and having strips on the bottom to hold them apart, a series of numbered detachable seed cups or receptacles arranged in the trays and sheets of suitable material for covering the trays.

4. A seed germinator comprising a box having a detachable cover, provided with a water discharge opening at the bottom and containing a series of numbered trays having perforated bottoms and a series of receptacles for seed.

5. A seed tester, comprising a suitable casing designed to contain water, means whereby the water in the casing may be drawn off, means whereby the casing may be inclosed to conserve moisture therein after the water is drawn off, and a series of seed receptacles contained within said casing, said seed receptacles being so positioned that the seeds therein may be wholly submerged when the casing is provided with water, for the purposes stated.

6. A seed tester, comprising a water-tight casing, means whereby the water within the casing may be drawn off, means whereby the casing may be wholly inclosed to conserve moisture after the water is drawn off, a series of seed cups within the casing, and means for identifying the seed cups for keeping a record of the seeds therein.

7. A seed tester, comprising a suitable casing designed to contain water, means whereby the water in the casing may be drawn off, means whereby the casing may be inclosed to conserve moisture therein after the water is drawn off, and a series of numbered seed receptacles arranged in the casing.

Des Moines, Iowa, July 2, 1909.

CLARK E. TWAMLEY.

Witnesses:
MATT VOLZ,
J. S. DESMOND.